(12) United States Patent
Buoniconti, IV et al.

(10) Patent No.: US 12,130,363 B2
(45) Date of Patent: Oct. 29, 2024

(54) LIDAR SYSTEM

(71) Applicant: Aurora Operations, Inc., Pittsburgh, PA (US)

(72) Inventors: Nicholas Anthony Buoniconti, IV, Palo Alto, CA (US); Yonggang Ha, Palo Alto, CA (US); Zhongjie Li, Palo Alto, CA (US); Cal Alden Smith, Palo Alto, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 17/592,286

(22) Filed: Feb. 3, 2022

(65) Prior Publication Data

US 2023/0243977 A1   Aug. 3, 2023

(51) Int. Cl.
*G01S 17/931* (2020.01)
*G01S 7/481* (2006.01)
*G01S 17/42* (2006.01)

(52) U.S. Cl.
CPC .......... *G01S 17/931* (2020.01); *G01S 7/4817* (2013.01); *G01S 17/42* (2013.01)

(58) Field of Classification Search
CPC ....... G01S 17/931; G01S 7/4817; G01S 17/42
See application file for complete search history.

(56) References Cited

U.S. PATENT DOCUMENTS

| | | | |
|---|---|---|---|
| 4,099,249 A | 7/1978 | Casasent | |
| 4,620,192 A | 10/1986 | Collins | |
| 4,648,276 A | 3/1987 | Klepper et al. | |
| 4,804,893 A | 2/1989 | Melocik | |
| 5,075,864 A | 12/1991 | Sakai | |
| 5,216,534 A | 6/1993 | Boardman et al. | |
| 5,223,986 A | 6/1993 | Mayerjak et al. | |
| 5,227,910 A | 7/1993 | Khattak | |
| 5,231,401 A | 7/1993 | Kaman et al. | |
| 5,461,505 A | 10/1995 | Nishikawa et al. | |
| 5,687,017 A * | 11/1997 | Katoh | G02B 5/09 359/850 |
| 5,781,156 A | 7/1998 | Krasner | |
| 5,828,585 A | 10/1998 | Welk et al. | |
| 5,947,903 A | 9/1999 | Ohtsuki et al. | |
| 5,999,302 A | 12/1999 | Sweeney et al. | |
| 6,029,496 A | 2/2000 | Kreft | |

(Continued)

FOREIGN PATENT DOCUMENTS

CN   101346773 A   1/2009
CN   102150007 A   8/2011

(Continued)

OTHER PUBLICATIONS

Principles of Communication—Modulation (Year: 2022).*

(Continued)

*Primary Examiner* — Isam A Alsomiri
*Assistant Examiner* — Sanjida Naser
(74) *Attorney, Agent, or Firm* — FOLEY & LARDNER LLP

(57) ABSTRACT

A light detection and ranging (LIDAR) system includes a laser source and a polygon scanner. The laser source is configured to generate a first beam. The polygon scanner includes a frame and a plurality of mirrors coupled to the frame, each mirror comprising a glass material.

15 Claims, 11 Drawing Sheets

(56) References Cited

U.S. PATENT DOCUMENTS

| | | |
|---|---|---|
| 6,211,888 B1 | 4/2001 | Ohtsuki et al. |
| 6,671,595 B2 | 12/2003 | Lu et al. |
| 6,753,950 B2 | 6/2004 | Morcom |
| 6,871,148 B2 | 3/2005 | Morgen et al. |
| 6,931,055 B1 | 8/2005 | Underbrink et al. |
| 7,122,691 B2 | 10/2006 | Oshima et al. |
| 7,152,490 B1 | 12/2006 | Freund et al. |
| 7,486,802 B2 | 2/2009 | Hougen |
| 7,511,824 B2 | 3/2009 | Sebastian et al. |
| 7,639,347 B2 | 12/2009 | Eaton |
| 7,742,152 B2 | 6/2010 | Hui et al. |
| 7,917,039 B1 | 3/2011 | Delfyett |
| 8,135,513 B2 | 3/2012 | Bauer et al. |
| 8,531,650 B2 | 9/2013 | Feldkhun et al. |
| 8,751,155 B2 | 6/2014 | Lee |
| 8,805,197 B2 | 8/2014 | Delfyett |
| 8,818,609 B1 | 8/2014 | Boyko et al. |
| 8,831,780 B2 | 9/2014 | Zelivinski et al. |
| 8,954,252 B1 | 2/2015 | Urmson et al. |
| 9,041,915 B2 | 5/2015 | Earhart et al. |
| 9,046,909 B2 | 6/2015 | Leibowitz et al. |
| 9,086,273 B1 | 7/2015 | Gruver et al. |
| 9,097,800 B1 | 8/2015 | Zhu |
| 9,348,137 B2 | 5/2016 | Plotkin et al. |
| 9,383,753 B1 | 7/2016 | Templeton et al. |
| 9,607,220 B1 | 3/2017 | Smith et al. |
| 9,618,742 B1 * | 4/2017 | Droz .................. G02B 26/12 |
| 9,753,462 B2 | 9/2017 | Gilliland et al. |
| 10,036,812 B2 | 7/2018 | Crouch et al. |
| 10,231,705 B2 | 3/2019 | Lee |
| 10,345,434 B2 | 7/2019 | Hinderling et al. |
| 10,422,649 B2 | 9/2019 | Engelman et al. |
| 10,485,508 B2 | 11/2019 | Miyaji et al. |
| 10,520,602 B2 | 12/2019 | Villeneuve et al. |
| 10,534,084 B2 * | 1/2020 | Crouch .................. H04B 10/40 |
| 10,568,258 B2 | 2/2020 | Wahlgren |
| 10,571,567 B2 * | 2/2020 | Campbell ......... H01L 27/14647 |
| 11,002,856 B2 | 5/2021 | Heidrich et al. |
| 11,041,954 B2 | 6/2021 | Crouch et al. |
| 11,249,192 B2 | 2/2022 | Crouch et al. |
| 11,402,506 B2 | 8/2022 | Ohtomo et al. |
| 11,441,899 B2 | 9/2022 | Pivac et al. |
| 2002/0071109 A1 | 6/2002 | Allen et al. |
| 2002/0140924 A1 | 10/2002 | Wangler et al. |
| 2002/0180868 A1 | 12/2002 | Lippert et al. |
| 2003/0117312 A1 | 6/2003 | Nakanishi et al. |
| 2004/0034304 A1 | 2/2004 | Sumi |
| 2004/0109155 A1 | 6/2004 | Deines |
| 2004/0158155 A1 | 8/2004 | Njemanze |
| 2004/0222366 A1 | 11/2004 | Frick |
| 2005/0149240 A1 | 7/2005 | Tseng et al. |
| 2006/0132752 A1 | 6/2006 | Kane |
| 2006/0239312 A1 | 10/2006 | Kewitsch et al. |
| 2007/0005212 A1 | 1/2007 | Xu et al. |
| 2007/0181810 A1 | 8/2007 | Tan et al. |
| 2008/0018881 A1 | 1/2008 | Hui et al. |
| 2008/0024756 A1 | 1/2008 | Rogers |
| 2008/0040029 A1 | 2/2008 | Breed |
| 2008/0100822 A1 | 5/2008 | Munro |
| 2009/0002679 A1 | 1/2009 | Ruff et al. |
| 2009/0009842 A1 | 1/2009 | Destain et al. |
| 2009/0030605 A1 | 1/2009 | Breed |
| 2009/0059201 A1 | 3/2009 | Willner et al. |
| 2010/0094499 A1 | 4/2010 | Anderson |
| 2010/0183309 A1 | 7/2010 | Etemad et al. |
| 2010/0188504 A1 | 7/2010 | Dimsdale et al. |
| 2010/0312432 A1 | 12/2010 | Hamada et al. |
| 2011/0013245 A1 | 1/2011 | Tanaka et al. |
| 2011/0015526 A1 | 1/2011 | Tamura |
| 2011/0026007 A1 | 2/2011 | Gammenthaler |
| 2011/0026008 A1 | 2/2011 | Gammenthaler |
| 2011/0205523 A1 | 8/2011 | Rezk et al. |
| 2011/0292371 A1 | 12/2011 | Chang |
| 2012/0038902 A1 | 2/2012 | Dotson |
| 2012/0127252 A1 * | 5/2012 | Lim ................... G02B 26/129 |
| | | 347/118 |
| 2012/0229627 A1 | 9/2012 | Wang |
| 2012/0274922 A1 | 11/2012 | Hodge |
| 2012/0281907 A1 | 11/2012 | Samples et al. |
| 2012/0306383 A1 | 12/2012 | Munro |
| 2013/0104661 A1 | 5/2013 | Klotz et al. |
| 2013/0120989 A1 | 5/2013 | Sun et al. |
| 2013/0268163 A1 | 10/2013 | Comfort et al. |
| 2013/0325244 A1 | 12/2013 | Wang et al. |
| 2014/0036252 A1 | 2/2014 | Amzajerdian et al. |
| 2014/0064607 A1 | 3/2014 | Grossmann et al. |
| 2015/0005993 A1 | 1/2015 | Breuing |
| 2015/0046119 A1 | 2/2015 | Sandhawalia et al. |
| 2015/0130607 A1 | 5/2015 | MacArthur |
| 2015/0160332 A1 | 6/2015 | Sebastian et al. |
| 2015/0177379 A1 | 6/2015 | Smith et al. |
| 2015/0185244 A1 | 7/2015 | Inoue et al. |
| 2015/0260836 A1 | 9/2015 | Hayakawa |
| 2015/0267433 A1 | 9/2015 | Leonessa et al. |
| 2015/0269438 A1 | 9/2015 | Samarasekera et al. |
| 2015/0270838 A1 | 9/2015 | Chan et al. |
| 2015/0282707 A1 | 10/2015 | Tanabe et al. |
| 2015/0323660 A1 | 11/2015 | Hampikian |
| 2015/0331103 A1 | 11/2015 | Jensen |
| 2015/0331111 A1 | 11/2015 | Newman et al. |
| 2016/0078303 A1 | 3/2016 | Samarasekera et al. |
| 2016/0084946 A1 | 3/2016 | Turbide |
| 2016/0091599 A1 | 3/2016 | Jenkins |
| 2016/0123720 A1 | 5/2016 | Thorpe et al. |
| 2016/0125739 A1 | 5/2016 | Stewart et al. |
| 2016/0216366 A1 | 7/2016 | Phillips et al. |
| 2016/0245903 A1 | 8/2016 | Kalscheur et al. |
| 2016/0260324 A1 | 9/2016 | Tummala et al. |
| 2016/0266243 A1 | 9/2016 | Marron |
| 2016/0274589 A1 | 9/2016 | Templeton et al. |
| 2016/0302010 A1 | 10/2016 | Sebastian et al. |
| 2016/0350926 A1 | 12/2016 | Flint et al. |
| 2016/0377721 A1 | 12/2016 | Lardin et al. |
| 2016/0377724 A1 | 12/2016 | Crouch et al. |
| 2017/0160541 A1 | 6/2017 | Carothers et al. |
| 2017/0248691 A1 | 8/2017 | McPhee et al. |
| 2017/0299697 A1 | 10/2017 | Swanson |
| 2017/0329014 A1 | 11/2017 | Moon et al. |
| 2017/0329332 A1 | 11/2017 | Pilarski et al. |
| 2017/0343652 A1 | 11/2017 | De Mersseman et al. |
| 2017/0350964 A1 | 12/2017 | Kaneda |
| 2017/0350979 A1 | 12/2017 | Uyeno et al. |
| 2017/0356983 A1 | 12/2017 | Jeong et al. |
| 2018/0003805 A1 | 1/2018 | Popovich et al. |
| 2018/0136000 A1 | 5/2018 | Rasmusson et al. |
| 2018/0188355 A1 | 7/2018 | Bao et al. |
| 2018/0224547 A1 | 8/2018 | Crouch et al. |
| 2018/0267556 A1 | 9/2018 | Templeton et al. |
| 2018/0276986 A1 | 9/2018 | Delp |
| 2018/0284286 A1 | 10/2018 | Eichenholz et al. |
| 2018/0299534 A1 | 10/2018 | Lachapelle et al. |
| 2018/0307913 A1 | 10/2018 | Finn et al. |
| 2019/0064831 A1 | 2/2019 | Gali et al. |
| 2019/0086514 A1 | 3/2019 | Dussan et al. |
| 2019/0107606 A1 | 4/2019 | Russell et al. |
| 2019/0154439 A1 | 5/2019 | Binder |
| 2019/0154807 A1 | 5/2019 | Steinkogler et al. |
| 2019/0154816 A1 * | 5/2019 | Hughes .................. G01S 7/497 |
| 2019/0154832 A1 | 5/2019 | Maleki et al. |
| 2019/0154835 A1 | 5/2019 | Maleki et al. |
| 2019/0258251 A1 | 8/2019 | Ditty et al. |
| 2019/0310351 A1 | 10/2019 | Hughes et al. |
| 2019/0310469 A1 | 10/2019 | Sapir |
| 2019/0317219 A1 | 10/2019 | Smith et al. |
| 2019/0318206 A1 | 10/2019 | Smith et al. |
| 2019/0346856 A1 | 11/2019 | Berkemeier et al. |
| 2019/0361119 A1 | 11/2019 | Kim et al. |
| 2020/0025879 A1 | 1/2020 | Pacala et al. |
| 2020/0049819 A1 | 2/2020 | Cho et al. |
| 2020/0049879 A1 | 2/2020 | Sato |
| 2020/0182978 A1 | 6/2020 | Maleki et al. |
| 2020/0192082 A1 | 6/2020 | Zhou et al. |
| 2020/0249349 A1 | 8/2020 | Steinberg |

(56) References Cited

U.S. PATENT DOCUMENTS

| | | | |
|---|---|---|---|
| 2021/0089047 A1 | 3/2021 | Smith et al. | |
| 2021/0165102 A1 | 6/2021 | Crouch et al. | |
| 2021/0325664 A1* | 10/2021 | Adams | G02B 26/105 |
| 2022/0260686 A1* | 8/2022 | Wang | G01S 17/42 |
| 2022/0413260 A1* | 12/2022 | Gassend | H01S 3/0811 |

FOREIGN PATENT DOCUMENTS

| | | |
|---|---|---|
| CN | 103227559 A | 7/2013 |
| CN | 103608696 A | 2/2014 |
| CN | 104793619 A | 7/2015 |
| CN | 104914445 A | 9/2015 |
| CN | 104956400 A | 9/2015 |
| CN | 105116922 A | 12/2015 |
| CN | 105425245 A | 3/2016 |
| CN | 105629258 A | 6/2016 |
| CN | 105652282 A | 6/2016 |
| CN | 107015238 A | 8/2017 |
| CN | 107024686 A | 8/2017 |
| CN | 107193011 A | 9/2017 |
| CN | 207318710 U | 5/2018 |
| DE | 10 2007 001 103 A1 | 7/2008 |
| DE | 10 2017 200 692 A1 | 8/2018 |
| EP | 1 298 453 A2 | 4/2003 |
| EP | 3330766 A1 * | 6/2018 ........... G01S 7/4817 |
| FR | 2568688 A1 | 2/1986 |
| GB | 2 349 231 A | 10/2000 |
| JP | S63-071674 A | 4/1988 |
| JP | H06-148556 A | 5/1994 |
| JP | H09-257415 A | 10/1997 |
| JP | H09-325290 A | 12/1997 |
| JP | 2765767 B2 | 6/1998 |
| JP | H11-153664 A | 6/1999 |
| JP | 2000-338244 A | 12/2000 |
| JP | 2002-249058 A | 9/2002 |
| JP | 2003-185738 A | 7/2003 |
| JP | 2006-148556 A | 6/2006 |
| JP | 2006-226931 A | 8/2006 |
| JP | 2007-155467 A | 6/2007 |
| JP | 2007-214564 A | 8/2007 |
| JP | 2007-214694 A | 8/2007 |
| JP | 2009-257415 A | 11/2009 |
| JP | 2009-288255 A | 12/2009 |
| JP | 2009-291294 A | 12/2009 |
| JP | 2011-044750 A | 3/2011 |
| JP | 2011-107165 A | 6/2011 |
| JP | 2011-203122 A | 10/2011 |
| JP | 2012-502301 A | 1/2012 |
| JP | 2012-103118 A | 5/2012 |
| JP | 2012-154863 A | 8/2012 |
| JP | 2015-125062 A | 7/2015 |
| JP | 2015-172510 A | 10/2015 |
| JP | 2015-212942 A | 11/2015 |
| JP | 2015-535925 A | 12/2015 |
| JP | 2017-138219 A | 8/2017 |
| JP | 2017-524918 A | 8/2017 |
| JP | 2018-173346 A | 11/2018 |
| JP | 2018-204970 A | 12/2018 |
| KR | 2018-0058068 A | 5/2018 |
| KR | 2018-0126927 A | 11/2018 |
| TW | 201516612 A | 5/2015 |
| TW | 201818183 A | 5/2018 |
| TW | 201832039 A | 9/2018 |
| TW | 201833706 A | 9/2018 |
| TW | 202008702 A | 2/2020 |
| WO | WO-2007/124063 A2 | 11/2007 |
| WO | WO-2010/127151 A2 | 11/2010 |
| WO | WO-2011/102130 A1 | 8/2011 |
| WO | WO-2014/011241 A2 | 1/2014 |
| WO | WO-2014/132020 A1 | 9/2014 |
| WO | WO-2015/037173 A1 | 3/2015 |
| WO | WO-2016/134321 A1 | 8/2016 |
| WO | WO-2016/164435 A1 | 10/2016 |
| WO | WO-2017/018065 A1 | 2/2017 |
| WO | WO-2018/066069 A1 | 4/2018 |
| WO | WO-2018/067158 A1 | 4/2018 |
| WO | WO-2018/102188 A1 | 6/2018 |
| WO | WO-2018/102190 A1 | 6/2018 |
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/062301 A1 | 4/2020 |

OTHER PUBLICATIONS

JP 3422720 B2 (Year: 2003).*

JP 3422720 B2 (translated) (Year: 2003).*

Adany, P. et al., "Chirped Lidar Using Simplified Homodyne Detection," Journal of Lightwave Technology, vol. 27, No. 16, Aug. 15, 2009, pp. 3351-3357.

Anonymous, "Fundamentals of Direct Digital Synthesis," Analog Devices, MT-085 Tutorial Rev. D, copyright 2009, pp. 1-9.

Anonymous, "Occlusion—Shadows and Occlusion—Peachpit", Jul. 3, 2006 (Jul. 3, 2006), P055697780,Retrieved from the Internet:URL:https://www.peachpit.com/articles/article.aspx?p=486505&seqNum=7[retrieved on May 25, 2020] 2 pages.

Aull, B. et al., "Geiger-Mode Avalanche Photodiodes for Three-Dimensional Imaging," Lincoln Laboratory Journal, vol. 13, No. 2, 2002, pp. 335-350.

Bashkansky, M. et al., "RF phase-coded random-modulation LIDAR," Optics Communications, vol. 231, 2004, pp. 93-98.

Beck, S. et al., "Synthetic-aperture imaging laser radar: laboratory demonstration and signal processing," Applied Optics, vol. 44, No. 35, Dec. 10, 2005, pp. 7621-7629.

Berkovic, G. and Shafir, E., "Optical methods for distance and displacement measurements", Advances in Optics and Photonics, vol. 4, Issue 4, Dec. 2012, pp. 441-471.

Besl, P. and McKay, N., "A Method for Registration of 3-D shapes", IEEE Transactions on Pattern Analysis and Machine Intelligence, vol. 14, No. 2, Feb. 1992, pp. 239-256.

Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.

Cao, X. et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.

Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.

Chinese Office Action on CN Appl. Ser. No. 201880009947.5 dated Oct. 11, 2021 (5 pages).

Contu, F., "The Do's and Don'ts of High Speed Serial Design in FPGA's". Xilinix All Programmable, Copyright 2013, High Speed Digital Design & Validation Seminars 2013, pp. 1-61.

Corrected Notice of Allowance on U.S. Appl. No. 16/725,419 dated May 28, 2020 (2 pages).

Crouch, S. and Barber, Z., "Laboratory demonstrations of interferometric and spotlight synthetic aperture ladar techniques," Optics Express, vol. 20, No. 22, Oct. 22, 2012, pp. 24237-24246.

Crouch, S. et al., "Three dimensional digital holographic aperture synthesis", Optics Express, vol. 23, No. 18, Sep. 7, 2015, pp. 23811-23816.

Dapore, B. et al., "Phase noise analysis of two wavelength coherent imaging system", Optics Express, vol. 21, No. 25, Dec. 16, 2013, pp. 30642-30652.

Decision of Rejection on JP Appl. Ser. No. 2019-527155 dated Jun. 8, 2021 (8 pages).

Decision of Rejection on JP Appl. Ser. No. 2020-559530 dated Aug. 31, 2021 (13 pages).

Duncan, B. and Dierking, M., "Holographic aperture ladar: erratum", Applied Optics, vol. 52, No. 4, Feb. 1, 2013, pp. 706-708.

Duncan, B. et al., "Holographic aperture ladar", Applied Optics, vol. 48, Issue 6, Feb. 20, 2009, pp. 1168-1177.

(56) References Cited

OTHER PUBLICATIONS

El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).
Extended European Search Report on EP Appl. Ser. No. 17876081.5 dated Jun. 3, 2020 (9 pages).
Extended European Search Report on EP Appl. Ser. No. 17876731.5 dated Jun. 17, 2020 (14 pages).
Extended European Search Report on EP Appl. Ser. No. 17888807.9 dated Jun. 3, 2020 (9 pages).
Extended European Search Report on EP Appl. Ser. No. 17898933.1 dated May 12, 2020 (7 pages).
Fehr, D. et al., "Compact Covariance descriptors in 3D point clouds for object recognition," presented at the Robotics and Automation (ICRA), May 14, 2012, IEEE International Conference, pp. 1793-1798.
Final US Office Action on U.S. Appl. No. 17/331,362 dated Nov. 29, 2021 (17 pages).
First Office Action on CN Appl. Ser. No. 201780081215.2 dated Mar. 3, 2021 (14 pages).
First Office Action on CN Appl. Ser. No. 201980033898.3 dated Apr. 20, 2021 (14 pages).
Foucras, M. et al., "Detailed Analysis of the Impact of the Code Doppler on the Acquisition Performance of New GNSS Signals," ION ITM, International Technical Meeting of The Institute of Navigation, San Diego, California, Jan. 27, 2014, pp. 1-13.
Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.
Haralick, R. et al., "Image Analysis Using Mathematical Morphology," IEEE Transactions In Pattern Analysis and Machine Intelligence, Jul. 1987, vol. PAMI-9, No. 4, pp. 532-550.
International Preliminary Report and Written Opinion on Patentability on Appl. Ser. No. PCT/US2018/041388 dated Jan. 23, 2020 (12 pages).
International Preliminary Report and Written Opinion on Patentability on Appl. Ser. No. PCT/US2019/028532 dated Oct. 27, 2020 (11 pages).
International Preliminary Report and Written Opinion on Patentability on Appl. Ser. No. PCT/US2019/068351 dated Jul. 15, 2021 (8 pages).
International Search Report and Written Opinion on Appl. Ser. No. PCT/US2017/062703 dated Aug. 27, 2018 (13 pages).
International Search Report and Written Opinion on Appl. Ser. No. PCT/US2017/062708 dated Mar. 16, 2018 (14 pages).
International Search Report and Written Opinion on Appl. Ser. No. PCT/US2017/062714 dated Aug. 23, 2018 (13 pages).
International Search Report and Written Opinion on Appl. Ser. No. PCT/US2017/062721 dated Feb. 6, 2018 (12 pages).
International Search Report and Written Opinion on Appl. Ser. No. PCT/US2018/016632 dated Apr. 24, 2018 (6 pages).
International Search Report and Written Opinion on Appl. Ser. No. PCT/US2018/041388 dated Sep. 20, 2018 (13 pages).
International Search Report and Written Opinion on Appl. Ser. No. PCT/US2018/044007 dated Oct. 25, 2018 (17 pages).
International Search Report and Written Opinion on Appl. Ser. No. PCT/US2019/028532 dated Aug. 16, 2019 (16 pages).
International Search Report and Written Opinion on Appl. Ser. No. PCT/US2019/068351 dated Apr. 9, 2020 (14 pages).
International Search Report and Written Opinion on Appl. Ser. No. PCT/US2021/032515 dated Aug. 3, 2021 (18 pages).
Johnson, A. et al., "Using spin images for efficient object recognition in cluttered 3D scenes", IEEE Trans. Pattern Anal. Mach. Intell., vol. 21, No. 5, May 1999, pp. 433-448.
Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.
Kachelmyer, A., "Range-Doppler Imaging with a Laser Radar", The Lincoln Laboratory Journal, vol. 3, No. 1, 1990, pp. 87-118.
Klasing, K. et al., "Comparison of Surface Normal Estimation Methods for Range Sensing Applications," 2009 IEEE International Conference on Robotics and Automation, May 12, 2009, pp. 3206-3211.
Krause, B. et al., "Motion compensated frequency modulated continuous wave 3D coherent imaging ladar with scannerless architecture", Applied Optics, vol. 51, No. 36, Dec. 20, 2012, pp. 8745-8761.
Le, T., "Arbitrary Power Splitting Couplers Based on 3×3 Multimode Interference Structures for All-Optical Computing", LACSIT International Journal of Engineering and Technology, vol. 3, No. 5, Oct. 2011, pp. 565-569.
Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).
Lu, M. et al., "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.
MacKinnon, D. et al., "Adaptive laser range scanning", American Control Conference, Piscataway, NJ, 2008, pp. 3857-3862.
Marron, J. et al., "Three-dimensional Lensless Imaging Using Laser Frequency Diversity", Applied Optics, vol. 31, No. 2, Jan. 10, 1992, pp. 255-262.
Miyasaka, T. et al., "Moving Object Tracking and Identification in Traveling Environment Using High Resolution Laser Radar", Graphic Information Industrial, vol. 43, No. 2, pp. 61-69, Feb. 1, 2011.
Monreal, J. et al., "Detection of Three Dimensional Objects Based on Phase Encoded Range Images", Sixth International Conference on Correlation Optics, vol. 5477, Jun. 4, 2004, pp. 269-280.
Munkres, J., "Algorithms for the Assignment and Transportation Problems", Journal of the Society for Industrial and Applied Mathematics, vol. 5, No. 1, Mar. 1957, pp. 32-38.
Non-Final Office Action on U.S. Appl. No. 16/464,648 dated Jun. 1, 2021 (6 pages).
Non-Final Office Action on U.S. Appl. No. 16/464,657 dated Dec. 22, 2021 (17 pages).
Non-Final Office Action on U.S. Appl. No. 16/725,419 dated Feb. 24, 2020 (4 pages).
Notice of Allowance for U.S. Appl. No. 16/725,399 dated Dec. 3, 2020 (11 pages).
Notice of Allowance on KR Appl. Ser. No. 10-2019-7019062 dated Feb. 10, 2021 (4 Pages).
Notice of Allowance on KR Appl. Ser. No. 10-2019-7019076 dated Feb. 15, 2021 (4 pages).
Notice of Allowance on KR Appl. Ser. No. 10-2019-7019078 dated Feb. 15, 2021 (4 pages).
Notice of Allowance on U.S. Appl. No. 16/464,648 dated Oct. 13, 2021 (7 pages).
Notice of Allowance on U.S. Appl. No. 15/423,978 dated Jul. 15, 2019 (8 pages).
Notice of Allowance on U.S. Appl. No. 15/645,311 dated Apr. 18, 2019 (13 pages).
Notice of Allowance on U.S. Appl. No. 16/515,538 dated Feb. 23, 2021 (16 pages).
Notice of Allowance on U.S. Appl. No. 16/725,419 dated Apr. 15, 2020 (9 pages).
Notice of Preliminary Rejection on KR Appl. Ser. No. 10-2021-7014545 dated Aug. 19, 2021 (17 pages).
Notice of Preliminary Rejection on KR Appl. Ser. No. 10-2021-7014560 dated Aug. 19, 2021 (5 pages).
Notice of Preliminary Rejection on KR Appl. Ser. No. 10-2021-7019744 dated Aug. 19, 2021 (15 pages).
Notice of Reasons for Refusal on JP Appl. Ser. No. 2019-527156 dated Dec. 1, 2020 (12 pages).

(56) References Cited

OTHER PUBLICATIONS

Notice of Reasons for Refusal on JP Appl. Ser. No. 2020-559530 dated Apr. 20, 2021 (11 pages).
Notice of Reasons for Refusal on JP Appl. Ser. No. 2021-165072 dated Nov. 30, 2021 (9 pages).
Notice of Reasons for Refusal on JP Appl. Ser. No. 2021-538998 dated Nov. 30, 2021 (20 pages).
O'Donnell, R., "Radar Systems Engineering Lecture 11 Waveforms and Pulse Compression," IEEE New Hampshire Section, Jan. 1, 2010, pp. 1-58.
Office Action on EP Appl. Ser. No. 19791789.1 dated Dec. 21, 2021 (12 pages).
Office Action on JP App. Ser. No. 2019-527155 dated Dec. 1, 2020 (10 pages).
Office Action on JP Appl. Ser. No. 2019-527155 dated Dec. 1, 2020 (8 pages).
Office Action on JP Appl. Ser. No. 2019-527224 dated Dec. 1, 2020 (6 pages).
Office Action on JP Appl. Ser. No. 2019-538482 dated Feb. 2, 2021 (6 pages).
Office Action on KR Appl. Ser. No. 10-2019-7018575 dated Jun. 23, 2020 (4 pages).
Office Action on KR Appl. Ser. No. 10-2019-7019062 dated Oct. 5, 2020 (6 pages).
Office Action on KR Appl. Ser. No. 10-2019-7019076 dated Jun. 9, 2020 (18 pages).
Office Action on KR Appl. Ser. No. 10-2019-7019078 dated Jun. 9, 2020 (14 pages).
Office Action on KR Appl. Ser. No. 10-2019-7022921 dated Aug. 26, 2020 (6 pages).
Office Action on U.S. Appl. No. 15/423,978 dated Mar. 22, 2019 (6 pages).
Office Action on U.S. Appl. No. 17/331,362 dated Aug. 19, 2021 (17 pages).
Optoplex Corporation, "90 degree Optical Hybrid", Nov. 9, 2016, 2 pages.
Rabb, D. et al., "Multi-transmitter Aperture Synthesis", Optics Express, vol. 18, No. 24, Nov. 22, 2010, pp. 24937-24945.
Roos, P. et al., "Ultrabroadband optical chirp linearization for precision metrology applications", Optics Letters, vol. 34, No. 23, Dec. 1, 2009, pp. 3692-3694.
Salehian, H. et al., "Recursive Estimation of the Stein Center of SPD Matrices and Its Applications", 2013 IEEE International Conference on Computer Vision (ICCV), Dec. 1, 2013, pp. 1793-1800.
Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.
Satyan, N. et al., "Precise control of broadband frequency chirps using optoelectronic feedback", Optics Express, vol. 17, No. 18, Aug. 31, 2009, pp. 15991-15999.
Second Office Action for KR Appl. Ser. No. 10-2021-7020076 dated Jun. 30, 2021 (5 pages).
Second Office Action on CN Appl. Ser. No. 201780081968.3 dated May 12, 2021 (7 pages).
Stafford, J. et al., "Holographic aperture ladar with range compression," Journal of the Optical Society of America, vol. 34, No. 5, May 2017, pp. A1-A9.
Supplementary European Search Report on EP Appl. Ser. No. 18748729.3 dated Nov. 20, 2020 (8 pages).
Supplementary European Search Report on EP Appl. Ser. No. 18831205.2 dated Feb. 12, 2021 (7 pages).
Supplementary European Search Report on EP Appl. Ser. No. 19791789.1 dated Dec. 9, 2021 (4 pages).
Third Party Submission on U.S. Appl. No. 16/725,375, filed Jun. 25, 2020 (73 pages).
Tippie, A. et al., "High-resolution synthetic-aperture digital holography with digital phase and pupil correction", Optics Express, vol. 19, No. 13, Jun. 20, 2011, pp. 12027-12038.
Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.
Wikipedia, "Digital-to-analog converter", retrieved from https://en.wikipedia.org/wiki/Digital-to-analog_converter, on Apr. 15, 2017, 7 pages.
Wikipedia, "Field-programmable gate array", retrieved from https://en.wikipedia.org/wiki/Field-programmable_gate_array, on Apr. 15, 2017, 13 pages.
Wikipedia, "In-phase and quadrature components", retrieved from https://en.wikipedia.org/wiki/In-phase_and_quadrature_components, on Jan. 26, 2018, 3 pages.
Wikipedia, "Phase-shift keying", retrieved from https://en.wikipedia.org/wiki/Phase-shift_keying#Binary_phase-shift_keying.28BPSK.29, on Oct. 23, 2016, 9 pages.
Ye, J., "Least Squares Linear Discriminant Analysis", 24th International Conference on Machine Learning, pp. 1087-1093 (as of Nov. 27, 2016).
Lu et al., "Recognizing objects in 3D point clouds with multi-scale features", Sensors 2014, 14, 24156-24173; doi: 10.3390/s141224156 (Year: 2014).
Notice of Reasons for Refusal on JP Appl. Ser. No. 2021-538998 dated Apr. 26, 2022 (11 pages).
Examination Report on EP Appl. Ser. No. 17898933.1 dated May 25, 2022 (5 pages).
Notice of Reasons for Refusal on JP Appl. Ser. No. 2021-118743 dated Jun. 7, 2022 (9 pages).
Farhad Samadzadegan et al., "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.
Notice of Reasons for Rejection issued in connection with JP Appl. Ser. No. JP 2021-126516 dated Jun. 21, 2022 (16 pages).
Chester, David B. "A Parameterized Simulation of Doppler Lidar", All Graduate Thesis and Dissertions, Dec. 2017, Issue 6794, <URL: https://digitalcommons.usu.edu/etd/6794 > * pp. 13-14, 27-28, 45*.
Korean Office Action issued in connection with KR Appl. Ser. No. 10-2021-7023519 dated Feb. 13, 2023.
Notice of Reasons of Rejection issued in connection with JP Appl. Ser. No. 2022-000212 dated Feb. 7, 2023.
Chinese Office Action issued in related CN Appl. Ser. No. 201780081804.0 dated Dec. 1, 2022 (20 pages).
Office Action issued in connection with Japanese Appl. No. 2022-569030 dated Aug. 22, 2023.
Stamatis et al., "3D automatic target recognition for future LIDAR missiles", Dec. 2016, IEEE Transactions on Aerospace and Electronic Systems 52(6):2662-2675, DOI:10.1109/TAES.2016.150300.
International Search Report and Written Opinion issued in connection with PCT/US2023/011341 dated Feb. 16, 2024.
Office Action issued in connection with Japanese Appl. No. 2023-095571 dated Feb. 20, 2024.
Office Action issued in connection with Chinese Appl. No. 202180034633.2 dated Mar. 9, 2024.
Office Action issued in connection with Chinese Appl. No. 202310820368.1 dated Feb. 28, 2024.

* cited by examiner

LIDAR SYSTEM

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system. The LIDAR system includes a laser source configured to generate a beam and a polygon scanner. The polygon scanner includes a frame and a plurality of mirrors coupled to the frame, each mirror including a glass material.

At least one aspect relates to an autonomous vehicle control system. The autonomous vehicle control system includes a laser source, a polygon scanner, and one or more processors. The laser source is configured to generate a first beam. The polygon scanner includes a frame and a plurality of mirrors coupled to the frame, each mirror comprising a glass material, the polygon scanner configured to reflect the first beam as a second beam. The one or more processors are configured to determine at least one of a range to an object or a velocity of the object using a third beam received from at least one of reflection or scattering of the second beam by the object, control operation of an autonomous vehicle responsive to the at least one of the range or the velocity.

At least one aspect relates to an autonomous vehicle. The autonomous vehicle includes a LIDAR system including a laser source configured to generate a first beam and a polygon scanner that includes a frame and a plurality of mirrors coupled to the frame, each mirror comprising a glass material. The autonomous vehicle includes a steering system, a braking system, and a vehicle controller including one or more processors configured to determine at least one of a range to an object or a velocity of the object using a third beam received from at least one of reflection or scattering of the second beam by the object, and control operation of the at least one of the steering system and the braking system responsive to the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR system can generate and transmit a light beam that an object can reflect or otherwise scatter as a return beam corresponding to the transmitted beam. The LIDAR system can receive the return beam, and process the return beam or characteristics thereof to determine parameters regarding the object such as range and velocity. The LIDAR system can apply various frequency or phase modulations to the transmitted beam, which can facilitate relating the return beam to the transmitted beam in order to determine the parameters regarding the object.

The LIDAR system can include a laser source and a polygon scanner. The laser source is configured to generate a first beam. The polygon scanner includes a frame and a plurality of mirrors coupled to the frame, each mirror comprising a glass material. The mirrors can reflect the first beam to output a second beam, which can be scanned over a field of view to be reflected or otherwise scattered by an object as a third beam, which can be used to determine range, velocity, and Doppler information regarding the object, such as for controlling operation of an autonomous vehicle.

Systems and methods in accordance with the present disclosure can implement LIDAR systems in which a polygon scanner is assembled by having multiple facets of polished glass mirrors that are attached to the frame, as compared to polygon scanners in which the scanner is formed by machining (e.g., computer numerical control (CNC) processes), such as by being made from diamond turned aluminum. By using polished glass mirrors for the facets, the surfaces of the facets can be made more flat and less rough, which can enable optical improvements such as higher reflectivity, lower scattering, and/or more particular beam shapes that are desirable for autonomous vehicles (e.g., beam shape having a lesser degree of variation from an ideal Gaussian beam). For example, making the facets more flat and/or less rough can reduce the likelihood of reflections or scattering occurring within surface of the facets themselves (such reflections or scattering can have Doppler shifts or otherwise contribute noise to the signal processing). In addition, the assembled polygon scanner can have reduced weight and/or inertia relative to polygon scanners made from solid metal blocks, which can improve reliability of the motor that rotates the polygon scanner and allow for greater flexibility in the form factor of the facets (e.g., to allow for larger facets or facets of various shapes, such as concave or convex facets). The assembled polygon scanner can be manufactured with a less complex, more scalable process. However, the advantages of the assembled polygon scanner described above are not limited to autonomous vehicles. They can be advantageous for any type of vehicles equipped with LIDAR sensors.

1. System Environments for Autonomous Vehicles

Figure 1A:
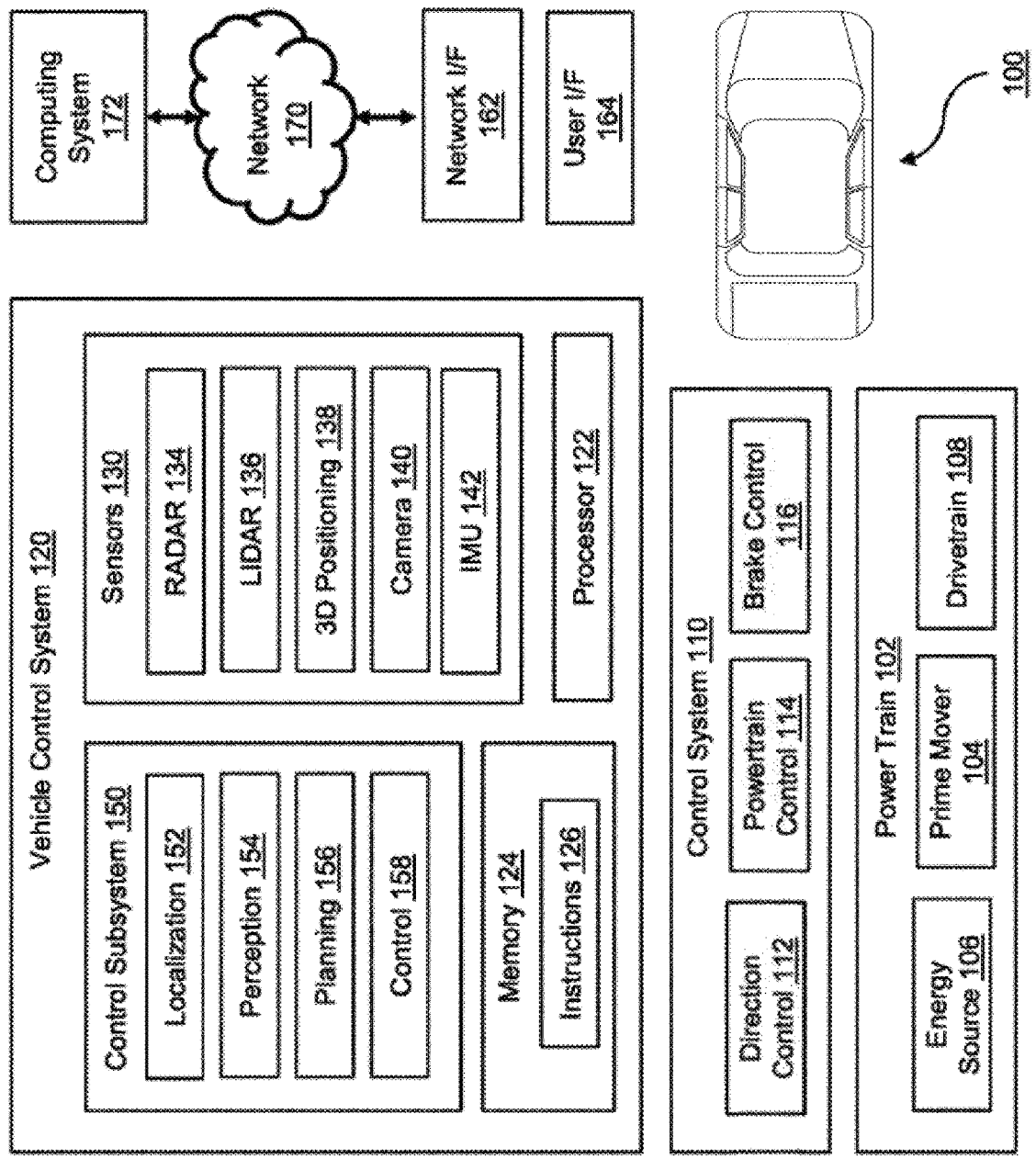
FIG. 1A is a block diagram of an example of a system environment for autonomous vehicles.

FIG. 1A is a block diagram illustrating an example of a system environment for autonomous vehicles according to some implementations. FIG. 1A depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1A can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 2:
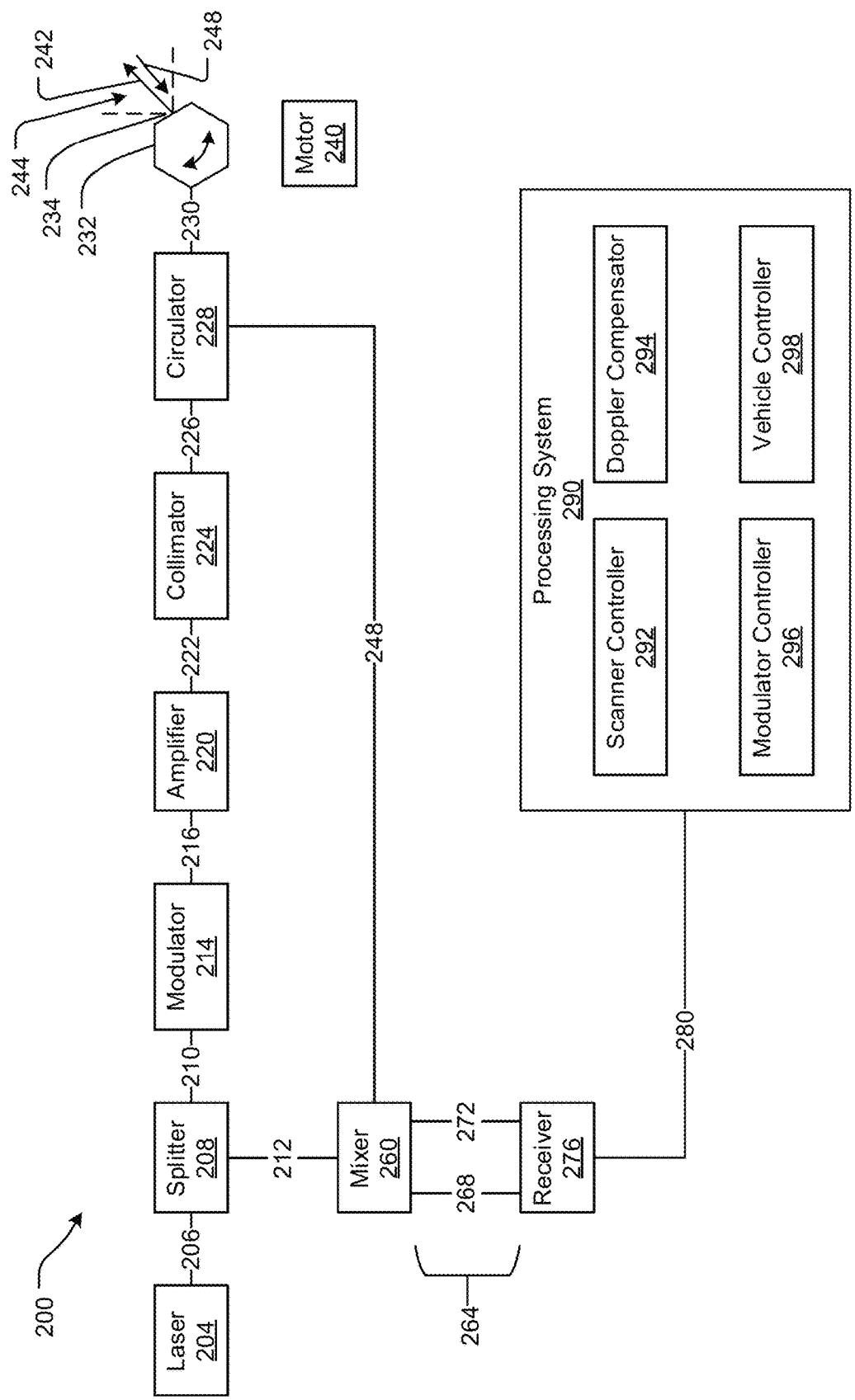
FIG. 2 is a block diagram of an example of a LIDAR system.

A truck can include a LIDAR system (e.g., vehicle control system 120 in FIG. 1A, LIDAR system 200 in FIG. 2, among others described herein). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectively object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams than conventional LIDAR systems.

Thus, by detecting an object at greater distances, an FM LIDAR system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

The FM LIDAR system can have less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling smoother driving.

The FM LIDAR system can be easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
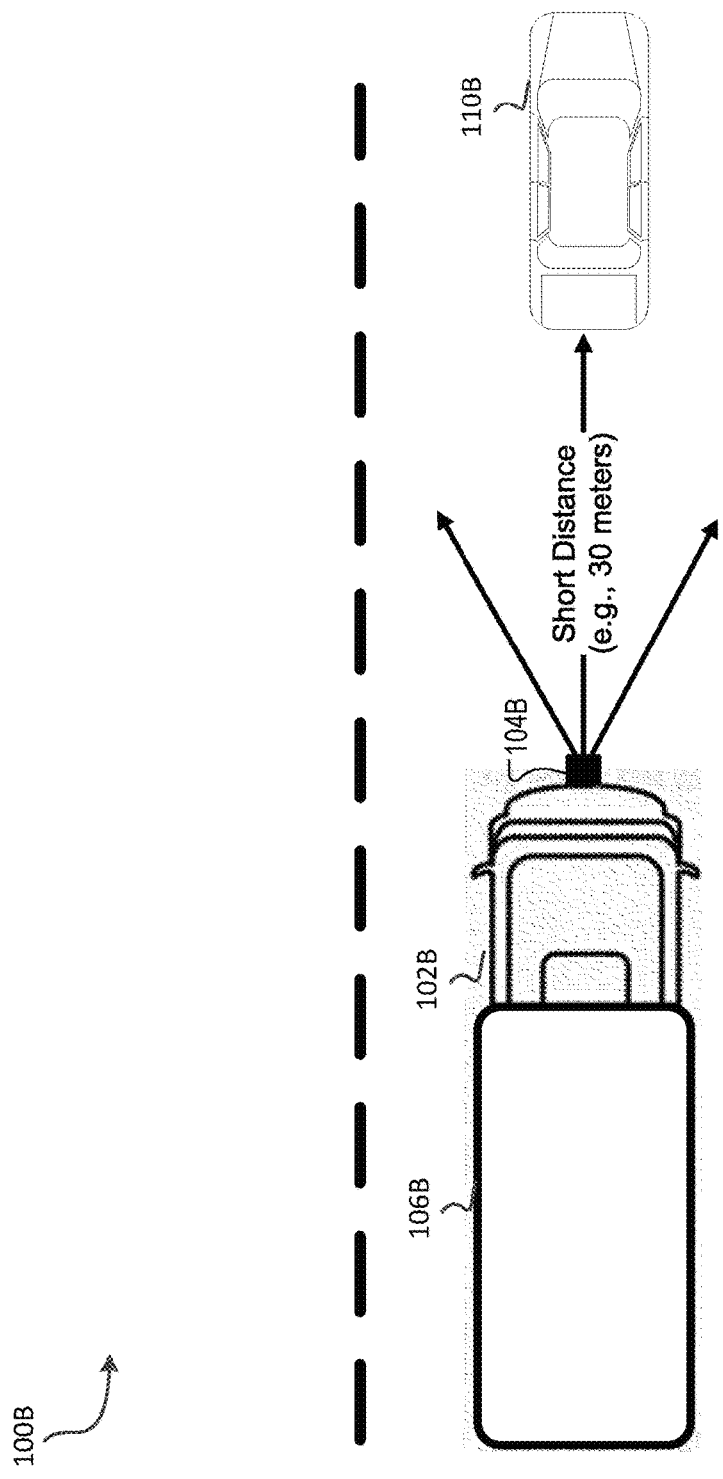
FIG. 1B is a block diagram of an example of a system environment for autonomous commercial trucking vehicles.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 200 in FIG. 2) for determining a distance to the object 110B and/or measuring the velocity of the object 110B. Although FIG. 1B shows that one LIDAR system 104B is mounted on the front of the commercial truck 102B, the number of LIDAR system and the mounting area of the LIDAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
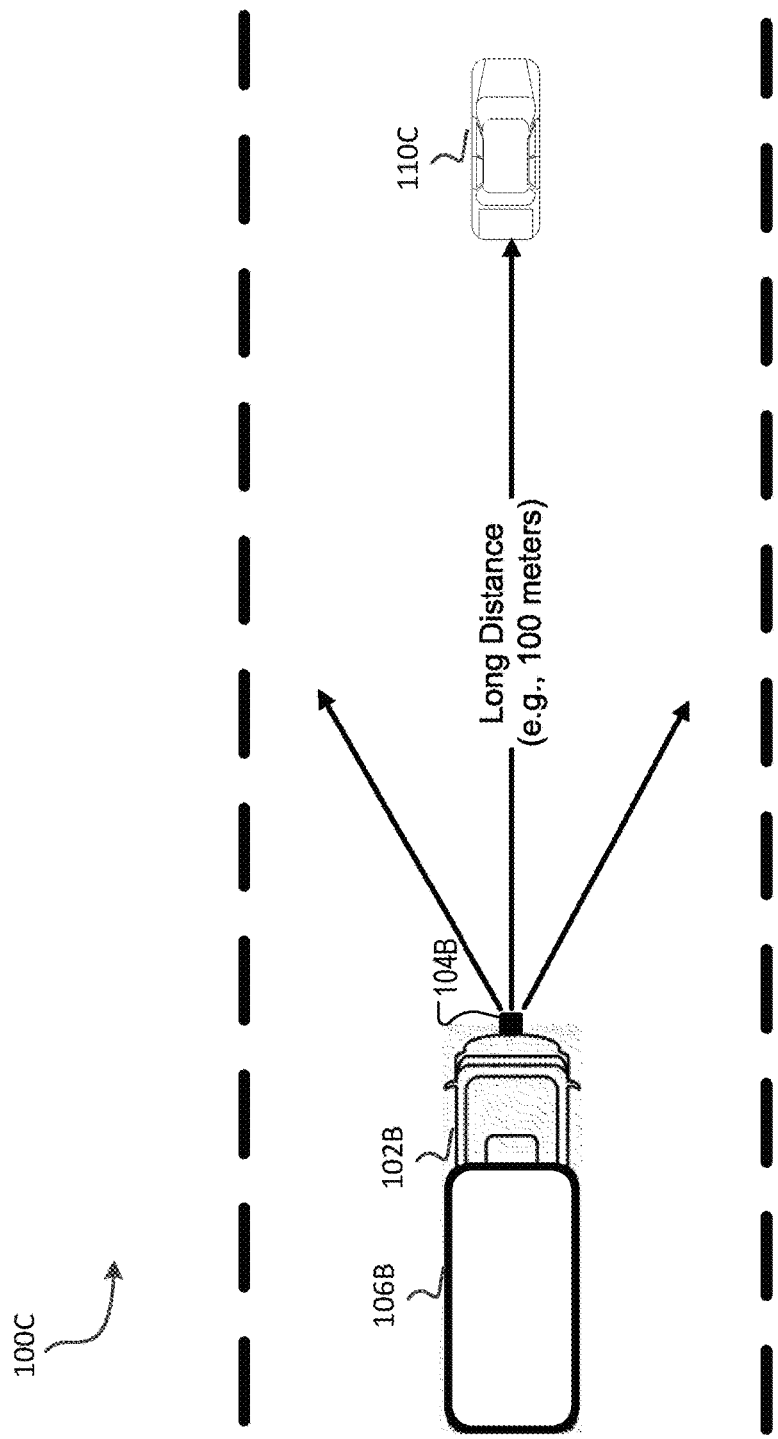
FIG. 1C is a block diagram of an example of a system environment for autonomous commercial trucking vehicles.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 1D:
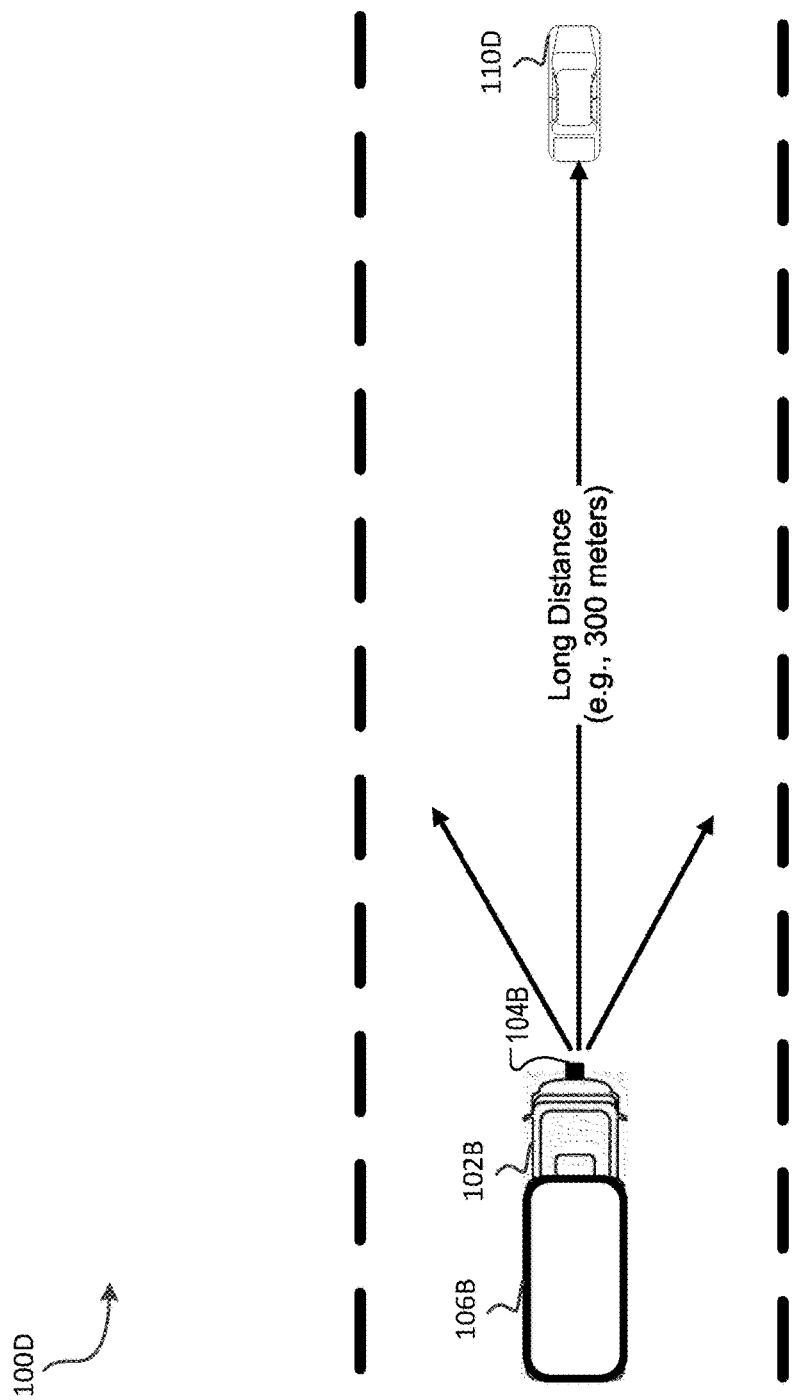
FIG. 1D is a block diagram of an example of a system environment for autonomous commercial trucking vehicles.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to move both people and goods across short or long distances. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. LIDAR Systems

FIG. 2 depicts an example of a LIDAR system 200. The LIDAR system 200 can be used to determine parameters regarding objects, such as range and velocity, and output the parameters to a remote system. For example, the LIDAR system 200 can output the parameters for use by a vehicle controller that can control operation of a vehicle responsive to the received parameters (e.g., vehicle controller 298) or a display that can present a representation of the parameters. The LIDAR system 200 can be a coherent detection system. The LIDAR system 200 can be used to implement various features and components of the systems described with reference to FIGS. 1A-1D. The LIDAR system 200 can include components for performing various detection approaches, such as to be operated as an amplitude modular LIDAR system or a coherent LIDAR system. The LIDAR system 200 can be used to perform time of flight range determination. In some implementations, various components or combinations of components of the LIDAR system 200, such as laser source 204 and modulator 214, can be in a same housing, provided in a same circuit board or other electronic component, or otherwise integrated. In some implementations, various components or combinations of components of the LIDAR system 200 can be provided as separate components, such as by using optical couplings (e.g., optical fibers) for components that generate and/or receive optical signals, such as light beams, or wired or wireless electronic connections for components that generate and/or receive electrical (e.g., data) signals.

The LIDAR system 200 can include a laser source 204 that generates and emits a beam 206, such as a carrier wave light beam. A splitter 208 can split the beam 206 into a beam 210 and a reference beam 212 (e.g., reference signal). In some implementations, any suitable optical, electronic, or opto-electronic elements can be used to provide the beam 210 and the reference beam 212 from the laser 204 to other elements.

A modulator 214 can modulate one or more properties of the input beam 210 to generate a beam 216 (e.g., target beam). In some implementations, the modulator 214 can modulate a frequency of the input beam 210 (e.g., optical frequency corresponding to optical wavelength, where $c=\lambda v$, where c is the speed of light, $\lambda$ is the wavelength, and v is the frequency). For example, the modulator 214 can modulate a frequency of the input beam 210 linearly such that a frequency of the beam 216 increases or decreases linearly over time. As another example, the modulator 214 can modulate a frequency of the input beam 210 non-linearly (e.g., exponentially). In some implementations, the modulator 214 can modulate a phase of the input beam 210 to generate the beam 216. However, the modulation techniques are not limited to the frequency modulation and the phase modulation. Any suitable modulation techniques can be used to modulate one or more properties of a beam. Returning to FIG. 2, the modulator 214 can modulate the beam 210 subsequent to splitting of the beam 206 by the splitter 208, such that the reference beam 212 is unmodulated, or the modulator 214 can modulate the beam 206 and provide a modulated beam to the splitter 208 for the splitter 208 to split into a target beam and a reference beam.

The beam 216, which is used for outputting a transmitted signal, can have most of the energy of the beam 206 outputted by the laser source 204, while the reference beam 212 can have significantly less energy, yet sufficient energy to enable mixing with a return beam 248 (e.g., returned light) scattered from an object. The reference beam 212 can be used as a local oscillator (LO) signal. The reference beam 212 passes through a reference path and can be provided to a mixer 260. An amplifier 220 can amplify the beam 216 to output a beam 222, which a collimator 224 can collimate to output a beam 226.

As depicted in FIG. 2, a circulator 228 can be between the collimator 224 and optics 232 to receive the beam 226 and output a beam 230 to the optics 232. The circulator 228 can be between the laser source 204 and the collimator 224. The circulator 228 can receive return beam 248 from the optics 232 and provide the return beam 248 to the mixer 260. The optics 232 can be scanning optics, such as one or more polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 232 can define a field of view 244 that corresponds to angles scanned (e.g., swept) by the beam 242 (e.g., a transmitted beam). For example, the beam 242 can be scanned in the particular plane, such as an azimuth plane or elevation plane (e.g., relative to an object to which the LIDAR system 200 is coupled, such as an autonomous vehicle). The optics 232 can be oriented so that the field of view 244 sweeps an azimuthal plane relative to the optics 232.

At least one motor 240 can be coupled with the optics 232 to control at least one of a position or an orientation of the optics 232 relative to the beam 230. For example, where the optics 232 include a reflector or deflector, the motor 240 can rotate the optics 232 so that surfaces of the optics 232 at which the beam 230 is received vary in angle or orientation relative to the beam 230, causing the beam 242 to be varied in angle or direction as the beam 242 is outputted from the optics 232.

The beam 242 can be outputted from the optics 232 and reflected or otherwise scattered by an object (not shown) as a return beam 248 (e.g., return signal). The return beam 248 can be received on a reception path, which can include the circulator 228, and provided to the mixer 260.

The mixer 260 can be an optical hybrid, such as a 90 degree optical hybrid. The mixer 260 can receive the reference beam 212 and the return beam 248, and mix the reference beam 212 and the return beam 248 to output a signal 264 responsive to the reference beam 212 and the return beam 248. The signal 264 can include an in-phase (I) component 268 and a quadrature (Q) component 272.

The LIDAR system 200 can include a receiver 276 that receives the signal 264 from the mixer 260. The receiver 276 can generate a signal 280 responsive to the signal 264, which can be an electronic (e.g., radio frequency) signal. The receiver 276 can include one or more photodetectors that output the signal 280 responsive to the signal 264.

The LIDAR system 200 can include a processing system 290, which can be implemented using features of the vehicle control system 120 described with reference to FIG. 1A. The processing system 290 can process data received regarding the return beam 248, such as the signal 280, to determine parameters regarding the object such as range and velocity. The processing system 290 can include a scanner controller 292 that can provide scanning signals to control operation of the optics 232, such as to control the motor 240 to cause the motor 240 to rotate the optics 232 to achieve a target scan pattern, such as a sawtooth scan pattern or step function scan pattern. The processing system 290 can include a Doppler compensator 294 that can determine the sign and size of a Doppler shift associated with processing the return beam 248 and a corrected range based thereon along with any other corrections. The processing system 290 can include a modulator controller 296 that can send one or more electrical signals to drive the modulator 214.

The processing system 290 can include or be communicatively coupled with a vehicle controller 298 to control operation of a vehicle for which the LIDAR system 200 is installed (e.g., to provide complete or semi-autonomous control of the vehicle). For example, the vehicle controller 298 can be implemented by at least one of the LIDAR system 200 or control circuitry of the vehicle. The vehicle controller 298 can control operation of the vehicle responsive to at least one of a range to the object or a velocity of the object determined by the processing system 290. For example, the vehicle controller 298 can transmit a control signal to at least one of a steering system or a braking system of the vehicle to control at least one of speed or direction of the vehicle.

Figure 3:
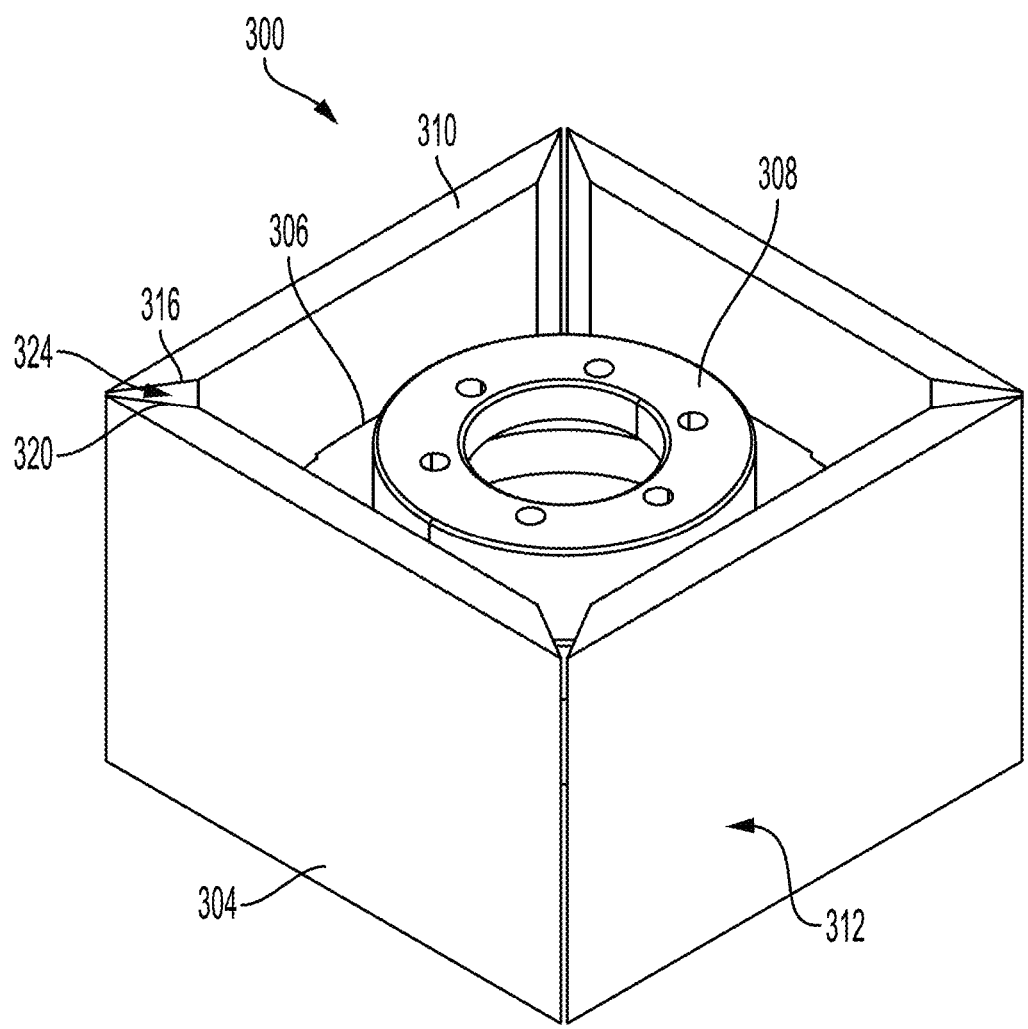
FIG. 3 is a perspective view of an example of a polygon scanner for use in a LIDAR system.
Figure 4:
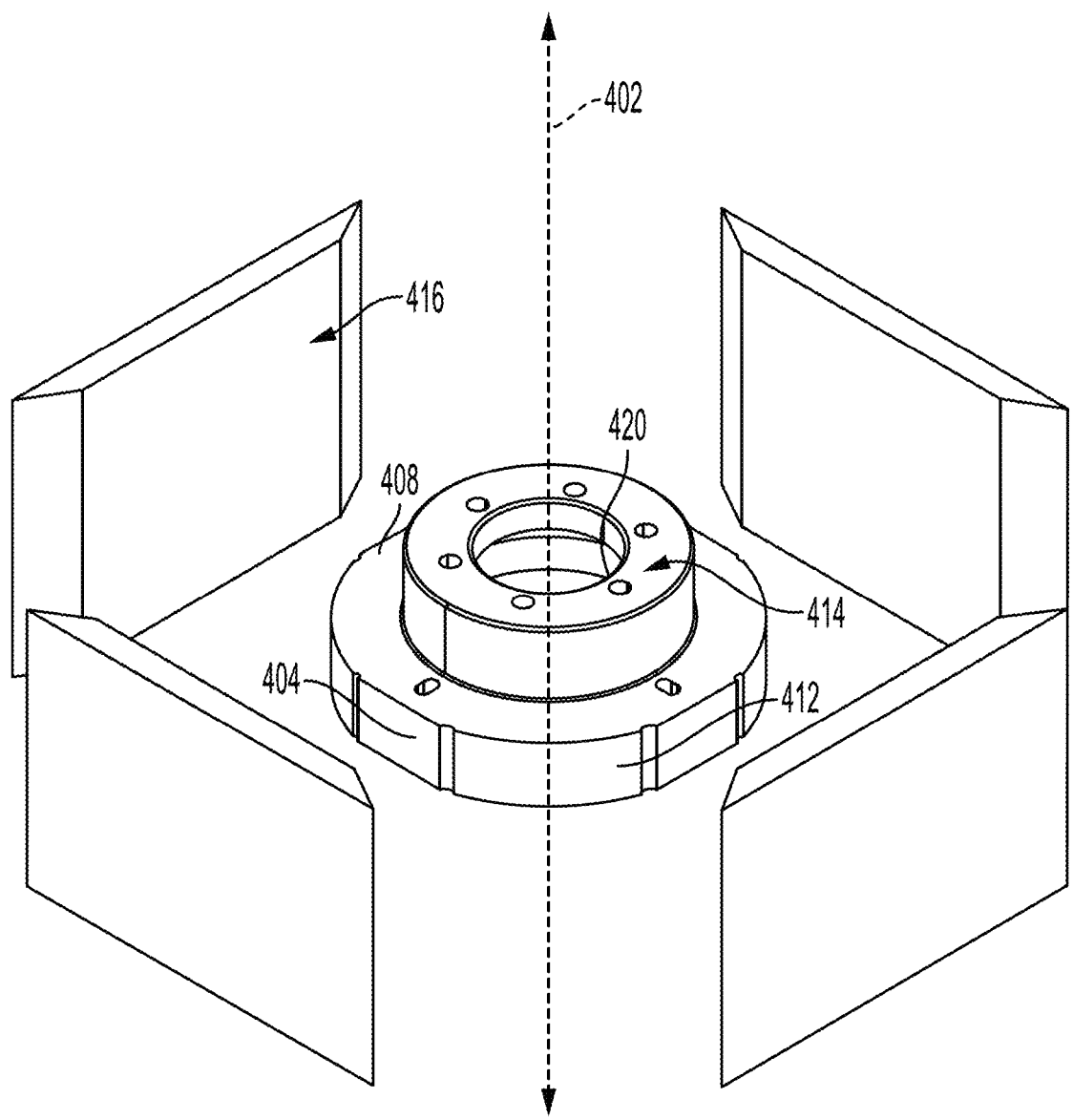
FIG. 4 is an exploded view of the polygon scanner of FIG. 3.
Figure 5:
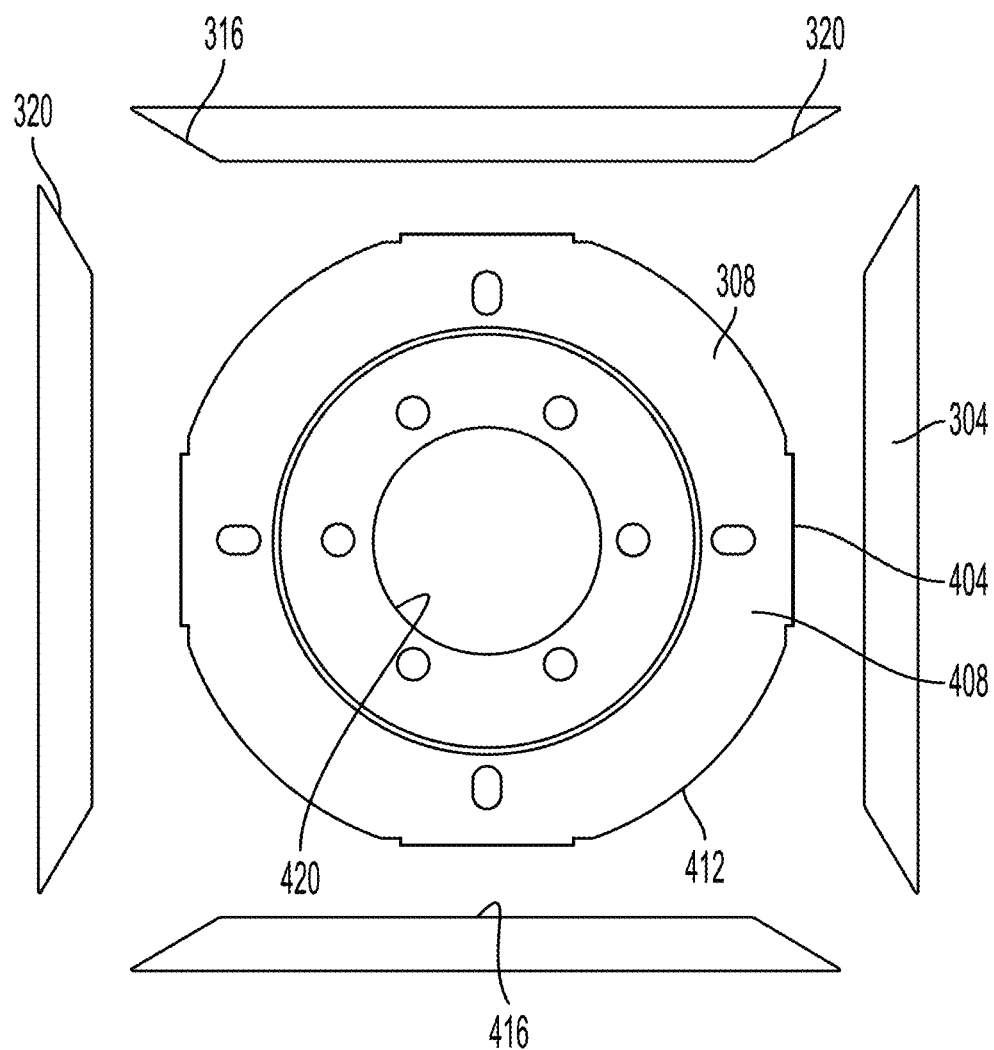
FIG. 5 is a top exploded view of the polygon scanner of FIG. 3.

FIGS. 3-5 depict an example of optics 300 for a scanner. The scanner includes the optics 232 and the motor 240 as described with reference to FIG. 2. For example, the LIDAR system 200 can include one or more scanners to transmit and/or receive beams to and from objects in order to determine information such as range, velocity, or Doppler effects associated with the objects.

In some implementations, the optics 300 can be an assembled polygon that includes a plurality of mirrors 304 coupled with a frame 308. By assembling the optics 300 from separate components, rather than forming the scanner by machining a metal block, the optics 300 can be made to have improved optical and mechanical performance, including mirror form factor flexibility, low weight/inertia for a given mirror size, optical surface quality (e.g., lack of roughness), lower cost at volume, and robustness with respect to stresses such as thermal, shock, and vibration stresses. For example, by forming the optics 300 as an assembled device, the scanner can have about half the mass and inertia about axis 402 relative to a solid metal scanner having a similar or equal mirror size (e.g., a mass of 0.09 kg and an inertia about axis 402 of 5.2 e-5 kg m$^2$, as compared to a solid metal scanner having a mass of 0.2 kg and an inertia of 1.05 e-5 kg m$^2$).

The mirrors 304 can be facets, and can have outward-facing surfaces 312 through which incoming beams are received and then reflected by the mirrors 304 to be outputted from the surfaces 312. The mirrors 304 can be reflective to light used for LIDAR applications (e.g., light received from the laser 204 via one or more components as depicted in FIG. 2 between the laser source 204 and the optics 232). For example, the mirrors 304 can be reflective to light having a wavelength greater than or equal to 1100 nm and less than or equal to 1800 nm, including light of about 1550 nm.

The optics 300 can include various numbers of mirrors 304. For example, the optics 300 can include greater than or equal to three and less than or equal to twelve mirrors 304. The mirrors 304 can be arranged around a perimeter 306 of the frame 308, such as to define a polygonal shape. Each mirror 304 can have a same shape as at least one other mirror 304, such as by having a rectangular shape with identical length and width, a circular or elliptical shape with identical perimeter, a convex or concave polygonal shape with identical numbers and lengths of sides, and various other such similar or identical shapes.

The mirrors 304 can be sized to extend outward from the frame 308; for example, a plane in which a surface 414 of the frame 308 lies can intersect at least one mirror 304 inward from an outer edge 310 of the at least one mirror 304. For example, the mirrors 304 can extend further than an extent of the frame 308 defined by the surface 414. The mirrors 304 can extend further above and further below the frame 308 in a frame of reference in which at least one of the axis 402 is parallel with gravity or the surface 414 is parallel with ground. The mirrors 304 can extend further than the surface 414 in a direction along the axis 402 (e.g., a projection of the mirrors 304 onto the axis 402 or a plane in which the axis 402 lies can be outward from the frame 308). This can allow the overall optical surface area of the mirrors 304 that can be used for reflecting incoming beams to be increased without increasing the size or weight of the frame 308, due to the assembled configuration and bonding of the mirrors 304 to the frame 308. As such, greater flexibility can be achieved for arranging various components of the LIDAR system 200 with respect to each other and with respect to the optics 300, which can enable the overall form factor to be decreased in size.

The mirrors 304 can include a glass material. For example, the mirrors 304 can include optical glass such as crown glass or flint glass. For example, the mirrors 304 can include K9 glass or BK7 glass, which can have improved thermal performance. As another example, the mirrors 304 can include glass of fused silica, which can operate effectively under conditions of UV and near infrared (NIR) light, with low coefficient of thermal expansion. The mirrors 304 can be formed by being cut from a larger glass panel, which can allow for more scalable production of the mirrors 304.

In some implementations, the mirrors 304 (e.g., surfaces 312) can be polished. Due to the use of glass for the mirrors 304 (e.g., rather than metal materials such as CNC machined and diamond turned aluminum), the mirrors 304 can be polished with greater flatness and lesser roughness, and as a result have improved optical properties, such as by reducing scattering of incoming light by the surfaces 312 (which can then be reflected off a backing of the mirrors 304 and then outputted from the surfaces 312, again with reduced scattering). For example, in an example test of scattering by glass mirrors 304 as compared with diamond turned aluminum (each coated with unprotected gold), the polished glass of the mirrors 304 was found to have relative scattering of 0.80 dB, while the metal (diamond turned aluminum) was found to have relative scattering of 6.14 dB. As such, the glass mirrors 304 can have reduced likelihood of scattering of light beams within the structures defining the roughness of the surfaces 312, which can address issues such as Doppler components being contributed to the beam's signal by the scattering. In turn, signal processing computational demands can be reduced, as signal processing needed to remove the Doppler components can be reduced or eliminated. In some implementations, the mirrors 304 can be coated with a coating. For example, gold (e.g., unprotected gold), can be used as a coating material. However, the coating material is not limited to gold. Instead, any suitable reflective material can be used as a coating material.

As depicted in FIGS. 3-5, the mirrors 304 can have rectangular shapes. The mirrors 304 can have various shapes or form factors, including concave or convex shapes, based on the shape of the glass panel from which the mirrors 304 are made, as well as how the mirrors 304 are cut or otherwise extracted from the glass panel. For example, the glass panel can be curved, so that the mirrors 304 are formed to be curved (e.g., concave or convex); the shape of the mirrors 304 as extracted from the glass panel can also be controlled to select a shape of the mirrors 304, such as to provide the mirrors 304 with rounded edges 310. As such, the mirrors 304 can be made to direct received beams in various directions or angles depending on the shape of the mirrors 304. The mirrors 304 can be made so that the surfaces 312 have relatively greater surface area than if denser metal were used for the mirrors 304 without increasing the weight/inertia of the mirrors 304 (or the size can be kept similar while reducing the weight/inertia). Moreover, by using glass to form the mirrors 304, the shapes or form factors of the mirrors 304 can more readily be selected and implemented for particular applications as compared to solid metal scanners.

In some implementations, each mirror 304 can extend from a first edge 316 to a second edge 320, and can be arranged so that there is a gap 324 between respective edges 316, 320 of adjacent mirrors 304. The gaps 324 can allow for expansion or other movement or change in shape of the mirrors 304, such as due to thermal or vibration effects. The edges 316, 320 can be angled, such that the gaps 324 decrease in size in a direction away from the axis 402 (while some gap 324 is still retained where edges 316, 320 meet surfaces 312). In some other implementations, the mirrors 304 can be arranged without any gap between respective edges 320 of adjacent mirrors 304.

The frame 308 can be made from a metal material, such as to be formed as a metal block. For example, the frame 308 can be made from aluminum. Using aluminum for the frame 308 can enable the frame 308 to be relatively lightweight and easy to manufacture. The frame 308 or portions thereof can be made from various materials, such as plastic or composite materials, that have sufficient rigidity or other material or structural properties across temperatures of operation of LIDAR system to allow for efficient force transfer from the frame 308 to the mirrors 304.

Each mirror 304 can be bonded at a respective bond surface 404 of the frame 308. The bond surfaces 404 can be positioned on or define the perimeter 306 of the frame 308. For example, the frame 308 can include a wall 408 (e.g., perimeter wall) that is oriented traverse to an axis 402 of the frame 308. The bond surfaces 404 can be defined on the wall 408. As depicted in FIG. 3, the bond surfaces 404 can extend over respective portions of the wall 408, such that there are portions 412 of the wall 408 between the bond surfaces 404 on either side of the bond surfaces 404. The portions 412 can be spaced from inner surfaces 416 of the mirrors 304 (as compared with solid form scanners, in which no spaces or gaps would be presented between the reflective surfaces and the inner portions of the scanner), the spacing defined in a plane extending through the wall 408 and perpendicular to the axis 402. The bond surfaces 404 can be flat, while the portions 412 can be curved or otherwise shaped to extend inward from the inner surfaces 416. A central portion of the inner surfaces 416 can be coupled with the bond surfaces 404 (e.g., the bond surfaces 404 can be centrally located on inner surfaces 416), which can minimize radial effects on the mirrors 304 or other components during thermal expansion and contraction due to changes in temperature.

An adhesive (e.g., bonding material) can be provided on the bond surfaces 404 (e.g., placed on a central portion of the inner surfaces 416 and/or bond surfaces 404) to attach the mirrors 304 to the bond surfaces 404, which can enable symmetric thermal expansion (e.g., with relatively low thermally developed expansion stresses). For example, an epoxy, such as a dispensed epoxy, can be used to attach the mirrors 304 to the bond surfaces 404. At least one of the material properties of the adhesive and the surface area of the bond surfaces 404 can be selected so that an attachment force between the bond surfaces 404 and the mirrors 304 is greater than an apparent (e.g., centrifugal) force resulting from the rotation of the optics 300 (e.g., rotation of the scanner of the optics 300) that would drive the mirrors 304 away from the bond surfaces 404 during operation of the optics 300 due to rotation of the optics 300 about the axis 402. For example, the attachment force can be greater than the centrifugal force at a maximum expected rotation rate of the scanner by at least a threshold. The adhesive can be selected to have a coefficient of thermal expansion that is similar or about equal to that of the mirrors 304, which can improve the performance of the optics 300 with respect to thermal expansion or contraction.

The frame 308 can include a shaft receiver 420 inward from the wall 408. The shaft receiver 420 can be a channel or other opening to allow a shaft (e.g., shaft or axle coupled with the motor 240 described with reference to FIG. 2) to engage the frame 308, so that the motor 240 can rotate the shaft rotate the frame 308 about the axis 402. The motor 240 can be coupled with the frame 308 using various shafts, gears, or other couplings to cause rotation of the frame 308 about the axis 402. The axis 402 can be defined to at least one of extend through the shaft receiver 420, coincide with an axis of rotation of the motor 240, or coincide with an axis of rotation of the shaft (e.g., the shaft may rotate about an axis offset from the motor 240 due to the use of gears or other assemblies).

Figure 6:
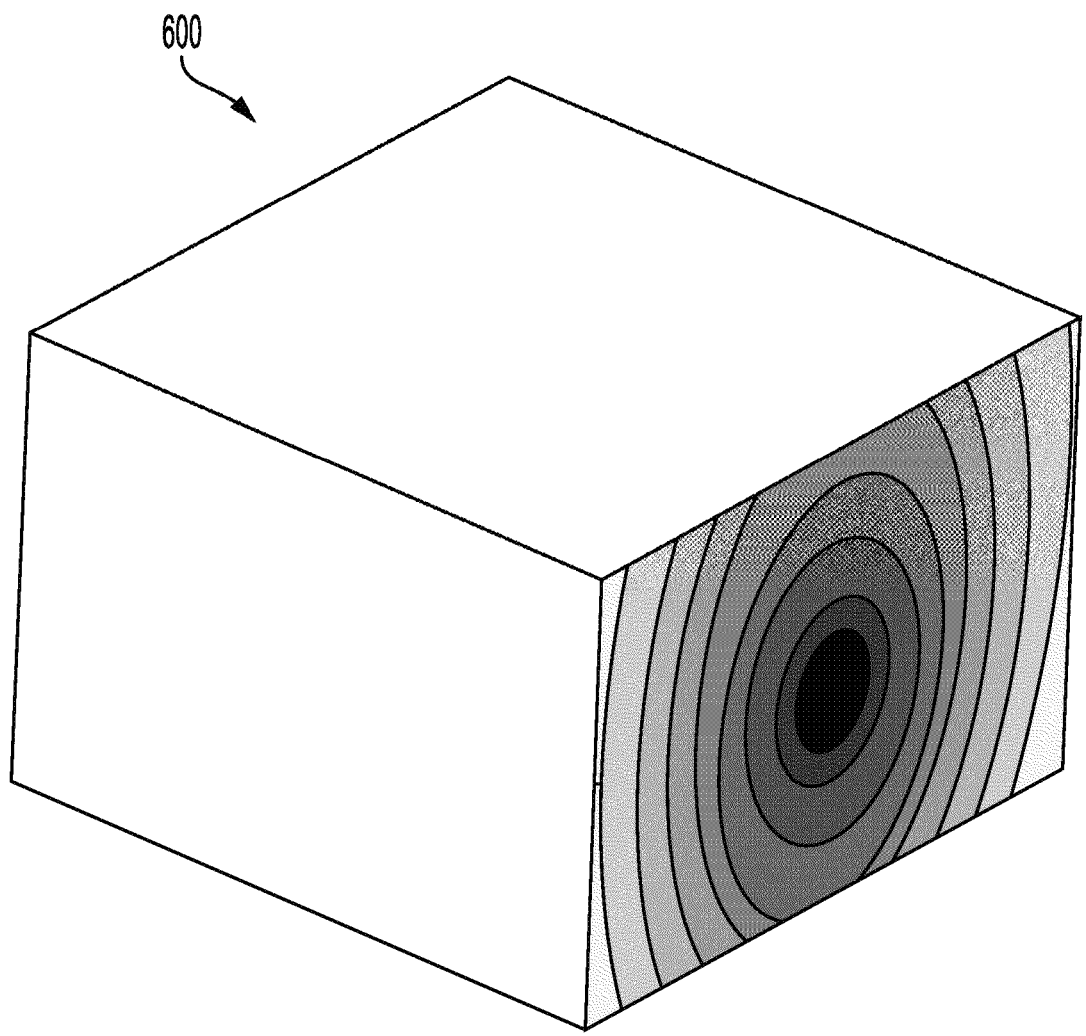
FIG. 6 is a chart of an example of a thermal loading test of a polygon scanner.
Figure 7:
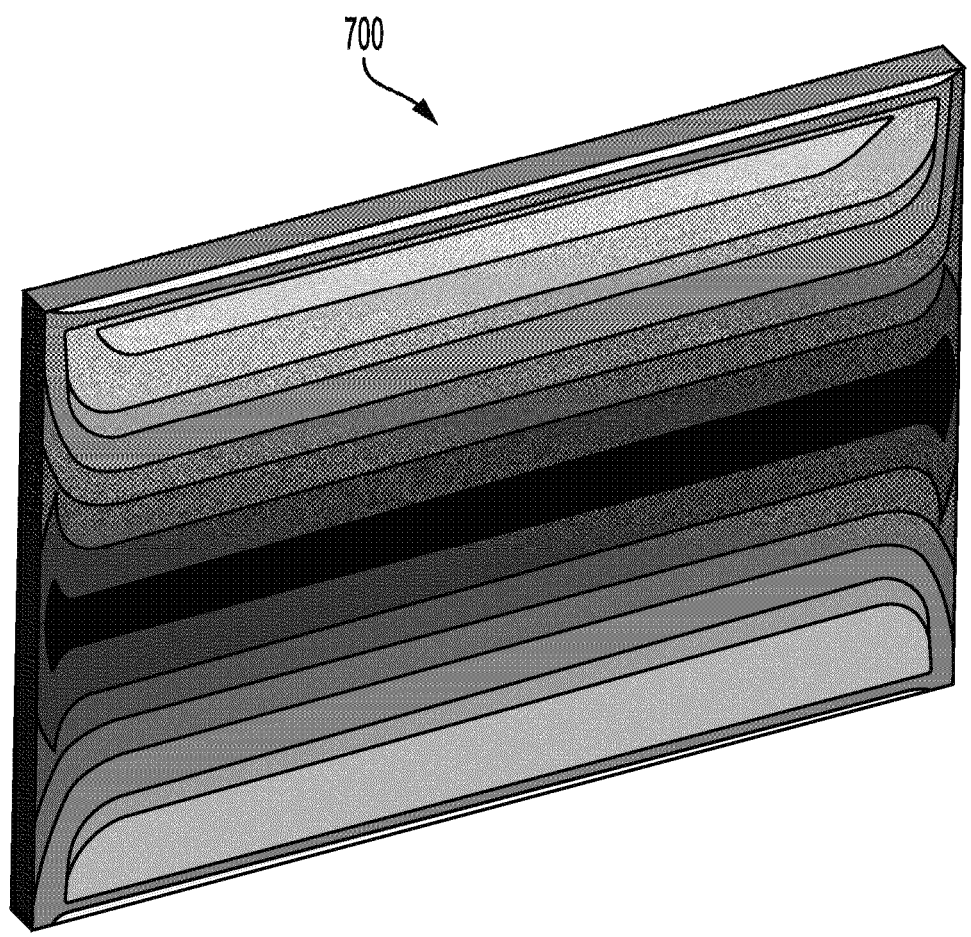
FIG. 7 is a chart of an example of a bonding test of a polygon scanner.
Figure 8:
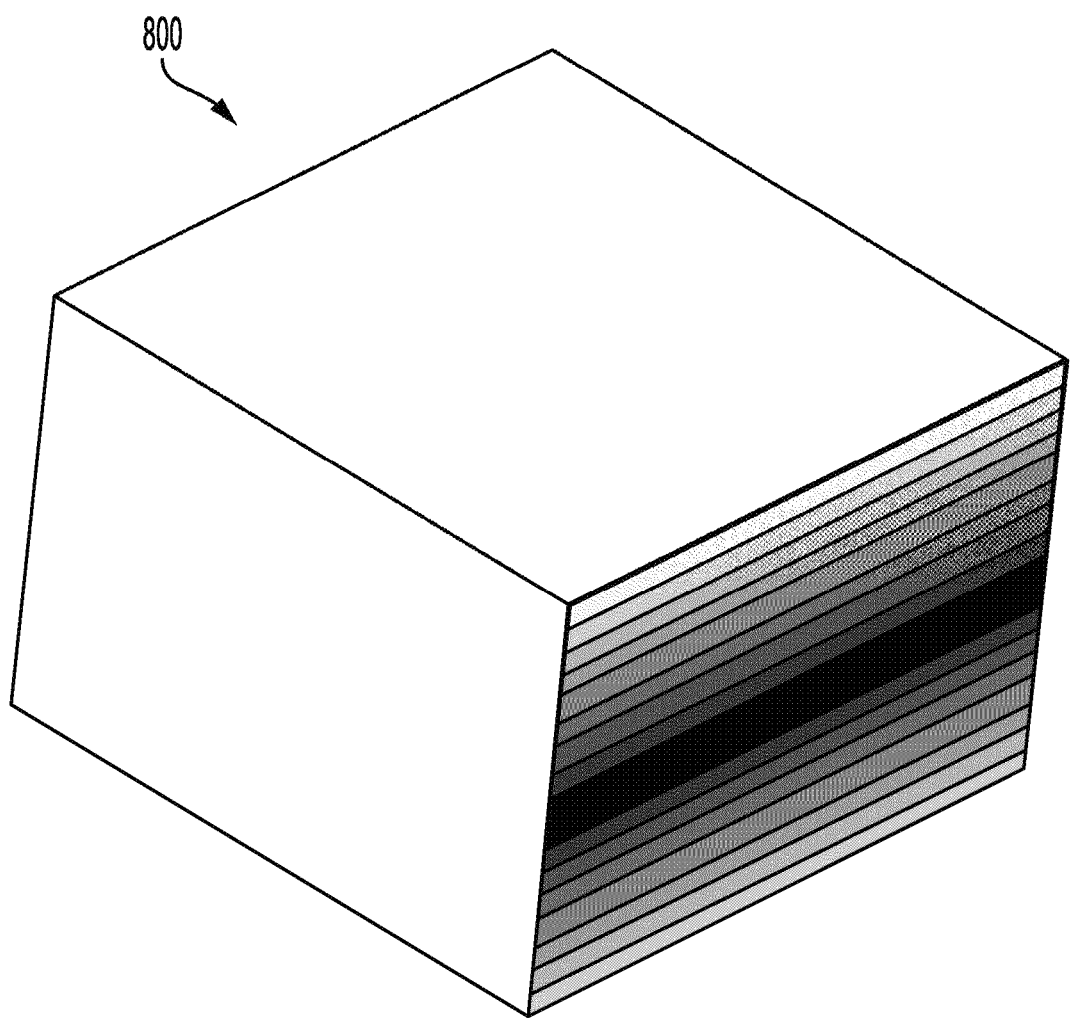
FIG. 8 is a chart of an example of a mirror displacement test of a polygon scanner.

FIGS. 6-8 depicts charts of studies of the performance of the mirrors 304 during operation and with respect to various environmental conditions, such as thermal, shock, and vibration conditions. As shown by FIGS. 6-8, the optics 300 can be designed as described herein to have minimal impact on optical surface quality under a wide temperature range, and low weight/inertia to have robustness advantages under shock/vibration (e.g., due to operation of the motor 240).

FIG. 6 depicts a chart 600 of distortion of the mirrors 304 with respect to thermal loading under the thermal stresses that can be expected for operation of a LIDAR system for automotive applications. For example, at least one mirror 304 can have a distortion out of a plane of the mirror 304 no greater than about 200 nm, such as from 0 nm to about 200 nm. As depicted in FIG. 6, the mirrors 304 were found to have distortion (e.g., translation out of a plane of the surfaces 312) ranging from 101 nm at a temperature of negative 20 degrees Celsius to 67 nanometers at a temperature of 50 degrees Celsius. Various features of the optics 300 described herein, such as centrally located coupling between the mirrors 304 and bond surfaces 404 to reduce or minimize bond-influenced stresses and distortions, can enable this distortion performance.

FIG. 7 depicts a chart 700 of bond patch peel load. The bond patch peel load can correspond to a vertical load resulting from shock stresses on the optics 300, such as shock transmitted from a vehicle to the optics 300 (e.g., through the motor 240). The optics 300 can be configured as described herein, such as based on the weight of the mirrors 304 and the bonding between the mirrors 304 and frame 308, such that in response to a 50 G vertical load, the mirrors 304 are subject to a 0.16 MPa bond peeling stress (which can correspond to a stress of 16 N/m given the size of the mirrors 304).

FIG. 8 depicts a chart 800 of angular displacement of the mirror 304 with respect to a vibration condition. As depicted in FIG. 8, in response to a vibration of 3 $G_{RMS}$ (root mean square acceleration associated with random vibration), the mirror 304 can have a 1.3 nm rigid body tilt, or 37.1e-9 radian angular displacement at a vibration of 667 Hz.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) system, comprising:
    a laser source configured to generate a beam; and
    a polygon scanner, comprising:
        a frame having a first flat frame surface and a second flat frame surface around an axis, and at least one frame portion between the first frame surface and the second frame surface; and
        a plurality of mirrors coupled to the frame, each mirror comprising a glass material, a central portion of an inner surface of a first mirror of the plurality of mirrors coupled to the first frame surface and a central portion of an inner surface of a second mirror of the plurality of mirrors coupled to the second frame surface, the at least one frame portion is spaced from the inner surface of the first mirror and curves from the first frame surface, the central portion of the first mirror is coupled to the first frame surface by an adhesive, the adhesive having a coefficient of thermal expansion about equal to a coefficient of thermal expansion of the first mirror, the first mirror extending further than the first frame surface in a direction along the axis, wherein the first mirror has a first edge adjacent to a second edge of the second mirror and a gap is between the first edge and the second edge.

2. The LIDAR system of claim 1, wherein each mirror comprises a polished glass material.

3. The LIDAR system of claim 1, further comprising a modulator configured to receive the beam and modulate at least one of a phase or a frequency of the beam to output a modulated beam to the polygon scanner.

4. The LIDAR system of claim 1, wherein a distortion of at least one mirror of the plurality of mirrors relative to a plane of the at least one mirror is from 0 nanometers (nm) to less than about 200 nm over a temperature range from about negative 20 degrees Celsius to about 50 degrees Celsius.

5. The LIDAR system of claim 1, wherein the frame is to rotate about the axis, and the direction is parallel with the axis.

6. The LIDAR system of claim 1, wherein the first edge is at a distance from the frame.

7. The LIDAR system of claim 1, wherein the first edge and the second edge are angled such that the gap decreases in size in a direction away from the axis.

8. An autonomous vehicle control system, comprising:
    a laser source configured to generate a first beam;
    a polygon scanner comprising a frame and a plurality of mirrors coupled to the frame, the frame having a first flat frame surface and a second flat frame surface around an axis, the frame comprising at least one frame portion between the first frame surface and the second frame surface, each mirror comprising a glass material, a central portion of an inner surface of a first mirror of the plurality of mirrors coupled to the first frame surface and a central portion of an inner surface of a second mirror of the plurality of mirrors coupled to the second frame surface, the at least one frame portion is spaced from the inner surface of the first mirror and curves from the first frame surface, the central portion of the first mirror is coupled to the first frame surface by an adhesive, the adhesive having a coefficient of thermal expansion about equal to a coefficient of thermal expansion of the first mirror, the first mirror extending further than the first frame surface in a direction along the axis, the polygon scanner configured to reflect the first beam as a second beam, wherein the first mirror has a first edge adjacent to a second edge of the second mirror and a gap is between the first edge and the second edge; and
    one or more processors configured to:
        determine at least one of a range to an object or a velocity of the object using a third beam received from at least one of reflection or scattering of the second beam by the object; and
        control operation of an autonomous vehicle responsive to the at least one of the range or the velocity.

9. The autonomous vehicle control system of claim 8, further comprising a motor configured to rotate the polygon scanner.

10. The autonomous vehicle control system of claim 8, wherein the one or more processors are configured to determine the range to the object based on a time of flight associated with the second beam and the third beam.

11. The autonomous vehicle control system of claim 8, wherein each mirror comprises a polished glass material.

12. The autonomous vehicle control system of claim 8, further comprising a modulator configured to receive the beam and modulate at least one of a phase or a frequency of the beam to output a modulated beam to the polygon scanner.

13. The autonomous vehicle control system of claim 8, wherein the first mirror is made from a material such that a distortion of the first mirror relative to a plane of the first mirror is from 0 nanometers (nm) to less than about 200 nm over a temperature range from about negative twenty degrees Celsius to about 50 degrees Celsius.

14. The autonomous vehicle control system of claim 8, wherein the frame surface is a first frame surface, and the frame comprises a second frame surface and at least one portion between the first frame surface and the second frame surface, the at least one portion spaced from the inner surface.

15. An autonomous vehicle, comprising: a LIDAR system, comprising: a laser source configured to generate a first beam; and a polygon scanner comprising a frame and a plurality of mirrors coupled to the frame, the frame having a first flat frame surface around an axis and a second flat frame surface around the axis, the frame comprising at least one frame portion between the first frame surface and the second frame surface, each mirror comprising a glass material, a central portion of an inner surface of a first mirror of the plurality of mirrors coupled to the first frame surface and a central portion of a second mirror of the plurality of mirrors coupled to the second frame surface, the at least one frame portion is spaced from the inner surface of the first mirror and curves from the first frame surface, the central portion of the first mirror is coupled to the first frame surface by an adhesive, the adhesive having a coefficient of thermal expansion about equal to a coefficient of thermal expansion of the first mirror, the first mirror extending further than the first frame surface in a direction along the axis, the polygon scanner configured to reflect the first beam to output a second beam, wherein the first mirror has a first edge adjacent to a second edge of the second mirror and a gap is between the first edge and the second edge; a steering system; a braking system; and a vehicle controller comprising one or more processors configured to: determine at least one of a range to an object or a velocity of the object using a third beam received from at least one of reflection or scattering of the second beam by the object; and control operation of the at least one of the steering system and the braking system responsive to the at least one of the range or the velocity.

* * * * *